O. K. SLETTO & W. J. SHANNON.
VEHICLE WHEEL.
APPLICATION FILED APR. 26, 1912.

1,058,006.

Patented Apr. 1, 1913.

WITNESSES:
Jessie Abbott.
V. M. C. Silva

INVENTORS
Oscar K. Sletto.
and William J. Shannon.
BY
O. O. Martin
ATTORNEY

COLUMBIA PLANOGRAPH CO., WASHINGTON, D. C.

UNITED STATES PATENT OFFICE.

OSCAR K. SLETTO AND WILLIAM J. SHANNON, OF BEND, OREGON.

VEHICLE-WHEEL.

1,058,006.   Specification of Letters Patent.   Patented Apr. 1, 1913.

Application filed April 26, 1912.   Serial No. 693,485.

*To all whom it may concern:*

Be it known that we, OSCAR K. SLETTO and WILLIAM J. SHANNON, citizens of the United States, residing at Bend, in the county of Crook and State of Oregon, have invented certain new and useful Improvements in Vehicle-Wheels, of which the following is a specification.

Our invention relates to vehicle wheels, and has particular reference to a new and improved tire structure for such wheels.

On light vehicles, such as automobiles, pneumatic tires are almost exclusively used, whereas pneumatic tires have not been found practical for use on heavy commercial vehicles.

The object of our invention is therefore to provide a resilient tire structure for the latter type of vehicle, although, of course, it may conveniently be used on lighter vehicles if so preferred.

With this aim in view, our invention comprises a pair of independent tires, yieldingly suspended in side by side relation from the rim or flange of the wheel so as to form a double tread, which latter is the preferred construction on heavy vehicles on account of the added traction power obtained.

In the following description the objects and advantages of our invention are fully explained, and in the appended drawing the embodiment of our invention is clearly illustrated.

Figure 1:
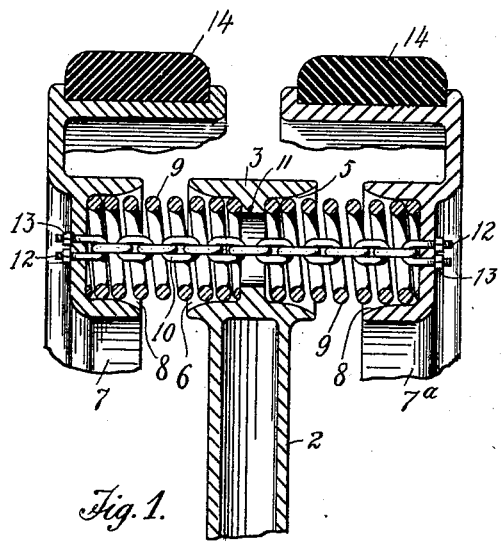
Figure 2:
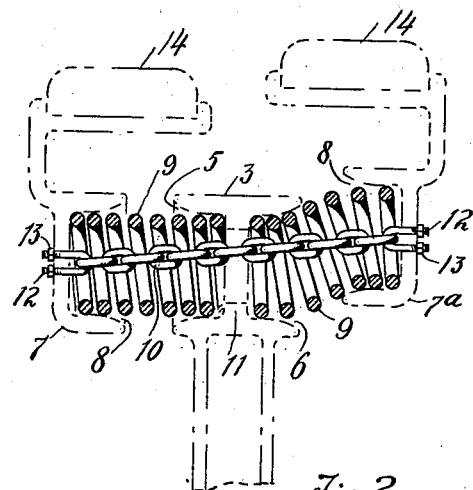
Figure 3:
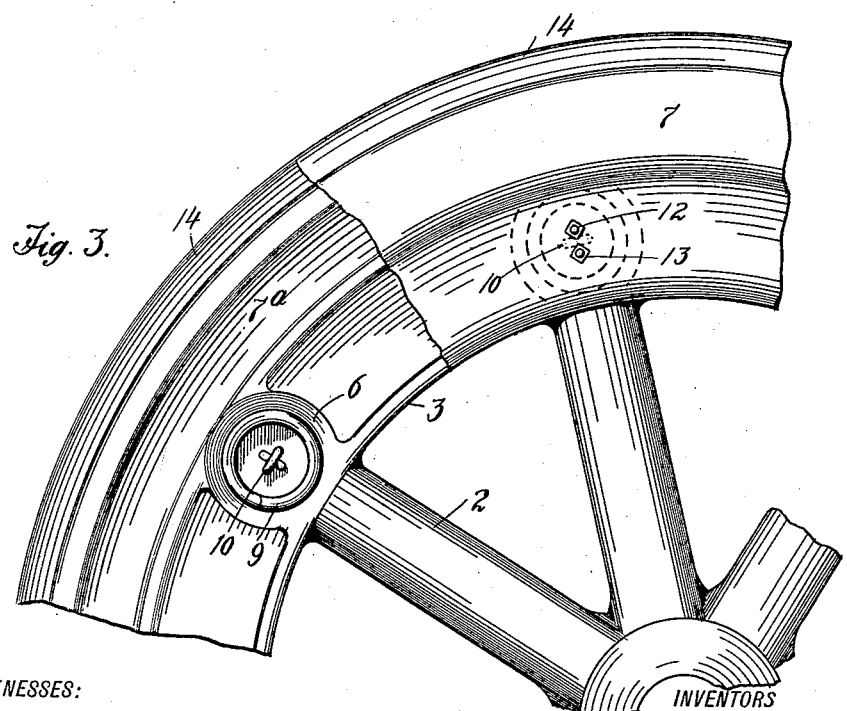

In the drawing: Figure 1 is a cross sectional view showing a portion of a double tread wheel, and the means of suspending the tires from the wheel. Fig. 2 is a similar view, partly drawn in diagrammatic outline for the sake of clearness, and illustrating the effect of an uneven pressure on the tires, and Fig. 3, is a fragmentary side elevation of a wheel substantially in agreement with the foregoing views.

The wheel proper comprises a hub 1, from which radiate suitable spokes 2, which terminate in an annular rim or felly 3. In the latter are provided equidistant sockets 5, 6, positioned on opposite sides of the rim and in continued alinement. The tires 7, 7ª are identically alike, but in mounting they are placed in right and left relation to the wheel as readily seen in the drawing.

The tires are on their inner wall made with a series of sockets 8, in every respect similar to the above named sockets 5, 6 of the wheel rim. A series of compression springs 9 are placed between the rim and the tires and are anchored in the said sockets, thereby tending to force the tires apart. Said springs encompass a series of chains or bands 10, which extend from tire to tire, thereby retaining the tires in spaced alinement on the wheel. The sockets 5, 6 of the wheel rim are separated by a wall 11, and this wall is perforated to admit said chain. Said perforations are made as large as possible, in order to allow the chains free play, sufficient wall being retained for seating the springs.

Any convenient means may be used for fastening the ends of the chains to the tires, but we prefer the construction illustrated, which comprises a series of U-bolts 12, extending through the wall of the tires, and threaded to receive suitable lock-nuts 13. This construction not only permits of adjustment, which is very essential, as it enables the operator to regulate the spring tension to suit the load to be carried, but it also aids the operation of assembling the wheel structure. That is to say, in assembling the parts may be positioned without compressing the springs, and the lock-nuts may then be turned to draw the tires into place against the tension of the springs.

Fig. 2 gives a fair illustration of the performance of our tire structure by showing how the tire 7ª is forced out of alinement by some obstruction on the road. The chains cannot stretch, consequently their deflection causes the tires to draw together against the tension of the springs, and thus the two tires can shift laterally independent of each other or simultaneously as the wheel passes over uneven ground. And as any lateral motion causes an increased compression of the springs, the latter always tend to return the tires to their alined position.

Any suitable tire treads may be employed, and in the drawing we show the tires provided with treads 14 composed of soft resilient rubber, which materially deadens the noise of the wheel, and aids in absorbing the initial shock on the wheel.

We claim:

1. In a vehicle wheel, the combination with a hub and an integral wheel-rim; of a pair of independent tires; adjustable means, independent of the wheel, for connecting said tires transversely so as to prevent spreading, said means permitting of independent shifting movement of the tires in a parallel plane; and yielding means confined within the spaces between the tires and the wheel-rim for holding said tires in spaced alinement at a distance from said rim.

2. In a vehicle wheel, the combination with a hub and an integral wheel-rim; of a pair of independent tires, both alike and arranged in right and left relation; a series of transverse chains connecting the tires so as to prevent spreading, said chains mounted to clear the wheel; and means interposed between said tires and said wheel-rim for yieldingly retaining the tires in spaced alinement away from said rim, said means mounted for independent action in the spaces on both sides of the said rim.

3. In a vehicle wheel, the combination with a hub and an integral wheel-rim; of a pair of independent tires, both alike and arranged in right and left relation; a series of transverse chains connecting the tires so as to prevent spreading; means for adjusting the length of said chains; and yielding means confined within the spaces between the tires and the wheel-rim for holding the said tires in spaced alinement.

4. In a vehicle wheel, the combination with a hub and an integral wheel-rim; of a pair of independent tires; a series of sockets equidistantly fixed on the inner wall of said tires; a corresponding series of sockets on each side of the wheel-rim in continued alinement, the wall between said latter sockets provided with a central perforation; a series of chains transversely connecting said tires so as to prevent spreading of the latter, said chains extending through said wheel perforations so as to clear the rim; and a series of compression springs positioned on each side of the wheel-rim and seated in each pair of opposed sockets, thereby encompassing said chains and yieldingly retaining the tires in spaced alinement.

5. In a vehicle wheel, the combination with a hub and an integral wheel-rim; of a pair of independent tires, both alike and arranged in right and left relation; a series of sockets equidistantly fixed on the inner wall of said tires; a corresponding series of sockets on each side of the wheel-rim and in continued alinement, the wall between the latter sockets provided with a central perforation; a series of transverse chains connecting the tires so as to prevent spreading, said chains extending through said rim perforations so as to clear the rim; means for adjusting the length of said chains; and a series of compression springs positioned on each side of the wheel-rim and seated in each pair of opposed sockets, thereby encompassing said chains and yieldingly retaining the tires in spaced alinement.

In testimony whereof, we have hereunto affixed our signatures in the presence of two witnesses.

OSCAR K. SLETTO.
WILLIAM J. SHANNON.

Witnesses:
   E. E. PARKER,
   A. N. JONES.

---

Copies of this patent may be obtained for five cents each, by addressing the "Commissioner of Patents, Washington, D. C."